MEMORY ARRANGEMENT

Original Filed March 31, 1965

INVENTORS
CARLOS F. CHONG
PAUL ZAKARIAN

BY Rene A. Kuypers
ATTORNEY 3,543,253

MEMORY ARRANGEMENT

Carlos F. Chong, Philadelphia, and Paul Zakarian, Lansdale, Pa., assignors to Sperry Rand Corporation, New York, N.Y., a corporation of Delaware Continuation of application Ser. No. 444,199, Mar. 31, 1965. This application Dec. 5, 1968, Ser. No. 800,305
Int. Cl. G11c *11/14, 7/00*
U.S. Cl. 340—174 6 Claims

ABSTRACT OF THE DISCLOSURE

A double amplitude drive pulse is coupled to a memory element such that the first amplitude provides bias and the second amplitude serves to read out the information stored in the memory with an increased signal to noise ratio.

This is a continuation of application No. 444,199, filed Mar. 31, 1965, and now abandoned.

This invention relates in general to magnetic data storage devices. In particular, this invention relates to magnetic data storage devices having the property of uniaxial anisotropy.

It is well recognized in the plated wire memory art that the signal induced in a plated wire during a read cycle is of relatively small amplitude. This amplitude is a function of the thickness of the magnetic coating and is approximately 10 millivolts for a 10,000 angstrom thickness. It can be appreciated that this relatively small amplitude signal requires high performance sensing devices in order to recover this information for useful purposes. The problem of sensing becomes still more acute if the small amplitude read-out signal is combined with a relatively high noise level. Under these circumstances, the noise signal may actually mask the information signal.

Accordingly, it is an object of this invention to provide a new and improved memory drive arrangement.

It is another object of this invention to provide a memory device having improved signal-to-noise ratio.

It is yet another object of this invention to provide improved signal-to-noise ratio in a uniaxial anisotropic magnetic data storage device.

It is also another object of this invention to provide a memory drive circuit which develops a reduced back voltage.

In accordance with the feature of this invention, a magnetically plated wire having a coating incorporating the property of uniaxial anisotropy is interrogated during a read cycle with a single drive pulse having two current levels with respect to a quiescent level. The second current level has a greater amplitude than does the first current level with respect to a quiescent level. This drive pulse is coupled to the plated wire by means of a drive line which is positioned substantially orthogonal to the plated wire. The first level of the above-mentioned drive pulse acts as a bias in that the magnetization vectors located at a bit position (i.e., the intersection of a magnetically plated wire and a drive line) are rotated to some angle. This rotation of the magnetization vectors causes no significant read-out of the plated wire. The second level (which is of greater amplitude with respect to a quiescent level than the first level) of the applied drive pulse rotates the magnetization vectors to an angle approaching 90°. This latter rotation does produce a significant read-out signal which is detected by an appropriate sensing device.

The above-mentioned read-out technique produces two significant features. The first feature consists in increasing the signal-to-noise ratio of the read-out signal. This is accomplished since the system does not utilize the read-out signal produced by the first current step but does utilize the read-out signal of the second current step. By this expedient, there is only a small percentage reduction of the read-out signal. On the other hand, there is a much greater reduction in the noise coupled into the sense line during a read-out cycle. Consequently, there is an increase in the signal-to-noise ratio.

A second feature of this invention resides in the fact that there is a considerable reduction in the back voltage produced when a drive line is energized by two-level step pulse. This feature reduces the design requirements of the driving circuitry.

The novel features that are considered characteristic of this invention are set forth with particularity in the appended claims. The invention itself, however, both as to its organization and method of operation, as well as additional objects and advantages thereof, will best be understood from the following description when considered in conjunction with the accompanying drawing, wherein:

Figure 1:
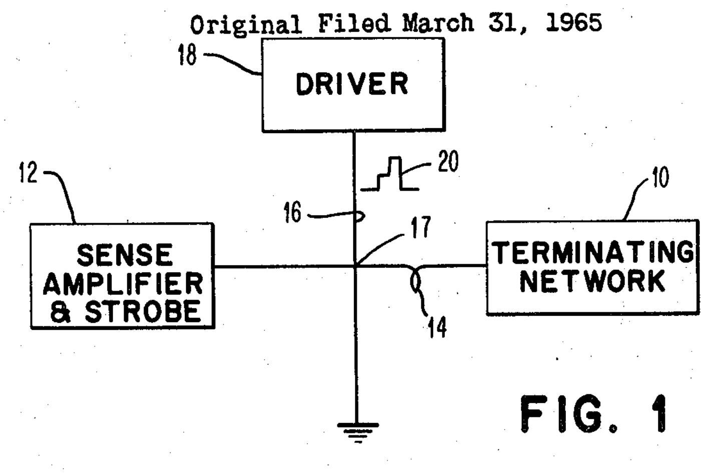
FIG. 1 depicts a typical thin-film, plated wire memory arrangement.

Referring now to FIG. 1, there is shown a typical plated wire memory arrangement. Thus, the plated wire 14 is a 5 mil diameter beryllium copper substrate coated with approximately a 10,000 angstrom thickness of magnetic material. The magnetic material is coated in the presence of a circumferential field so as to induce in the magnetic coating the property of uniaxial anisotropy. In other words, the magnetic material acquires an easy axis of magnetization around the circumference of the wire. The magnetization vectors, depending upon whether a binary "1" or binary "0" is stored in a certain bit position, are oriented in one of two equilibrium positions along the easy axis. This orientation along the easy axis of magnetization enables the plated wire 14 to operate as a binary logic device.

Placed substantially orthogonal and in juxtaposition to the plated wire 14 is the drive line 16. The intersection of the plated wire 14 and the drive line 16 comprises a memory bit position 17. The plated wire 14 is connected at one end to a detector and strobe 12 and at the other end to a terminating network 10. Similarly, the drive line 16 is connected at one end to a drive circuit 18 and at the other end to ground potential.

In operation, a current pulse applied by a driver 18 to the drive line 16 causes a rotation of the magnetization vectors located at the bit position 17 to some angle less than 90°. This rotation of the magnetization vectors induces a voltage in the plated wire 14. This voltage travels both to the detector 12 and to the terminating network 10. Thus, if the terminating network 10 is matched to the impedance of the plated wire 14, the signal is not reflected back to the sense amplifier 12 but rather is absorbed therein. It should be noted that the plated wire 14 is spaced in close relationship to a ground plane (not shown) and this accounts for the transmission line characteristics described above. Depending upon the orientation of the magnetization vectors at the bit 17, the induced signal on the plated wire 14 is either of positive or negative polarity. The detection of this positive or negative signal occurs in the sense amplifier 12. The current applied by circuit 18 to the drive line 16 is the drive pulse 20 having two amplitude levels. This pulse is shown in greater detail in FIG. 2.

Figure 2:
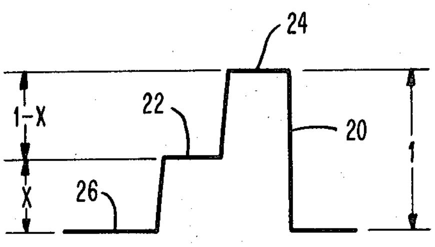
FIG. 2 shows a double step current pulse applied to the drive line of FIG. 1.

A study of FIG. 2 indicates a quiescent level 26 for the signal 20. Quiescent level 26 represents a zero current level (i.e., no current is being applied by the driver 18 of FIG. 1). The first level of the current pulse 20 is designated as 22 and the second level of the current pulse is designated as 24. The pulse 20 may be generated by techniques familiar to those skilled in the electronic art. One such technique comprises generating the first level 22 by means of a conventional pulse generating circuit. The second level 24 is then generated by turning on a second driver shortly after the first driver was turned on. In this manner, the composite signal 20 is obtained by electrically adding the two generated currents.

Figure 3:
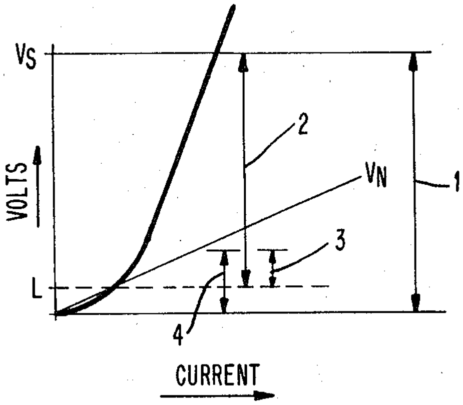
FIG. 3 depicts approximate voltage signals induced in the sense line of FIG. 1 as a function of current.

The voltages induced in the plated wire 14 (which also serves as a sense line) by application of a drive pulse 20 in the memory arrangement of FIG. 1 is depicted in FIG. 3. It will be recalled that in a plated magnetic wire memory element, the application of a drive pulse 20 to a drive line 16 (FIG. 1) causes the magnetization vectors located at a certain bit position to be rotated from either one of the two equilibrium positions to same angle less than 90°. This rotation of the magnetization vectors induces a voltage in the plated wire 14 the polarity of which is indicative whether a binary "1" or a binary "0" is stored at the bit position 17. The non-linear signal, V*s* depicted in FIG. 3 represents the output signal induced in a plated wire sense line 14 (FIG. 1) as a function of drive current. The signal V*n* superimposed upon the signal V*s* represents the noise coupled into the sense line 14 by the drive pulse because of coupling. Coupling occurs between a drive line and a sense line in view of their close proximity. The signal, V*n*, is considered to be linear since for an increase in current there is a corresponding increase in voltage. In other words, as the current increases the voltage increases by some factor *k*. On the other hand, the voltage V*s* is not linear since for an increase in current, the voltage increases by some factor which is greater than *k*.

The induced voltage V*s* in a plated wire sense line may be represented by the following formula, namely, $$Vs=A(1-\cos\theta)$$

where $\theta$ represents the angle to which the magnetization vectors are rotated and A is a constant related to the total output signal. The voltage, V*n*, capacitively coupled into the sense line may be represented by the following formula, namely, $$Vn=C\frac{dv}{dt}$$

where C is the capacitive coupling between the drive line 16 and the sense line 14, and *dv/dt* equals the rate of change of voltage which produced the drive pulse 20.

Returning now to FIG. 3, it will be recalled that V*s* is the output signal induced in a plated wire sense line 14 (FIG. 1) by applying a current pulse 20 to the drive line 16. V*n* is the noise signal coupled to the sense line 14 by the energized drive line 16 since they are juxtaposed to one another. For ease of understanding, that portion of V*s* and V*n* which is developed by the first step 22 of the drive current pulse 20 (FIG. 2) lines below the bias level L, whereas that portion of V*s* and V*n* which is obtained by the current step 24 lies above the bias level L.

By referring to the vertical amplitude vectors 1 and 4, a graphical study can be made of how the drive pulse 20 produces an increase in the signal-to-noise ratio. It is readily apparent that the read-out signal, V*s*, above the bias level L increases non-linearly at a much faster rate than does V*n*. Thus, by utilizing only that portion of V*s* represented by the amplitude vector 2, it is apparent that there is only a small percentage reduction in amplitude over that of the magnitude vector 1. On the other hand, since V*n* rises linearly, there is a large percentage reduction of noise as seen by comparing the vectors 3 and 4. In other words, by utilizing the bias step current 22 of pulse 20, there occurs a small percentage reduction of useful read-out signal, V*s*, (as represented by vector 2) but a much larger reduction of noise, V*n* (as represented by vector 3). Consequently, there is a corresponding increase in signal-to-noise. It should be noted that the induced voltage generated during the step 24 of the drive pulse 20 is sensed during this time period by strobing.

In a typical example, it can be shown that for a decrease of 14% of the signal V*s* by using a bias level L (the first 22 step of FIG. 2) there is a corresponding 50% reduction of the noise signal V*n*. For these particular figures, the signal-to-noise ratio is increased approximately 1.73 times. This signal-to-noise ratio is significant in view of the fact that the induced voltage of a plated wire is of relatively small amplitude.

The above results may be explained mathematically as well as graphically. Letting the ratio of the rurrent level 22 to the current level 24 be *x*:1 and recalling that the noise signal is directly proportional to the drive current, the reduction of noise signal when introducing a drive current 20 (FIG. 2) over a drive current that goes up to level 24 in a single step is $(1-x)$. On the other hand, since the readout signal caused by the first current level 22 is proportioned to $(1-\cos\theta)$, the readout signal caused by the second current level 24 is proportioned to $[1-(1-\cos\theta)]$ or $\cos\theta$. Thus, the increase in signal-to-noise ratio may be represented by the following mathemetical formula, namely, $$(\text{increase in})\ \frac{\text{signal}}{\text{noise}}=\frac{\cos\theta}{1-x}$$

where $$\theta=\sin^{-1}\frac{h}{h_k}$$

(i.e., $h$ equals the applied field and $h_k$ equals the anisotropy field for 90° rotation). Now let us assume that $x=\frac{1}{2}$. Substituting this value in the above formula we then arrive at the following.

$$(\text{increase in})\ \frac{\text{signal}}{\text{noise}}=\frac{\cos(\sin^{-1}.5)}{1-.5}=\frac{.866}{.5}=1.73$$

Figure 4:
FIG. 4 represents the back voltage existing in the drive line of FIG. 1 during the application of the current pulse shown in FIGS. 1 and 2.

The drive pulse 20 applied to the drive line 16 of FIG. 1 produces another advantage in addition to an increase in signal-to-noise ratio. This improvement consists in reducing the back voltage normally present in driving an inductive load. The back voltage results from the well known Action-Reaction Law and is commonly called Lenz's Law. Lenz's Law states that the induced EMF is in such a direction as to oppose the change causing it, and in mathematical terms is as follows, namely, $$E=-L\frac{di}{dt}$$

where L equals the inductance of the drive line and *di/dt* represents a change of current with respect to time. These back voltage pulses are represented in FIG. 4 wherein the first pulse 28 is the back voltage produced by the first current step 22 of FIG. 2 and the back voltage pulse 30 is produced by the current step 24. It is apparent therefore that if the drive pulse 20 were applied as a single step the resulting back voltage would be the sum of the amplitudes of the pulses 28 and 30. It is well recognized that the greater the back voltage, the greater the possibility of damaging the driving circuit which may be a semiconductor device. Also, the lower back voltage, the higher the frequency response of the transistor semiconductor device. Therefore, it is desirable to keep the back voltage as represented by pulses 28 and 30 as low as possible which, in fact, is achieved by the instant invention.

In summary, this invention relates to a memory read drive technique which comprises utilizing a transverse field which incorporates two current levels. Two current levels are utilized so that the first level biases the plated wire and the second level produces the significant readout of the information stored at a particular bit location. The increased signal-to-noise ratio occurs in a plated wire because the plated wire is a function of the cosine of the angle of rotation of its magnetization vector, and hence, the greatest output occurs in the plated wire during the application of the second amplitude current step. As a result, there is only a slight decrease of the output level of the plated wire by utilizing a bias current, whereas there is a significant decrease of the noise signal coupled into the plated wire. It should be recognized that although this invention has been described with respect to a plated wire storage element, its teachings are readily adaptable to other well known storage devices, operated in either destructive readout mode or non-destructive readout mode.

Obviously, many modifications and variations to the present invention are possible in the light of the above teaching. It is therefore, to be understood, that within the scope of the appending claims, the invention may be practiced otherwise and as specifically described.

The embodiments of the invention in which an exclusive property or privilege is claimed are defined as follows:

1. A memory device comprising:

(a) a thin film data storage element adapted to store an information signal, said element having an EASY and HARD axis of magnetization wherein the magnetization is oriented quiescently along said EASY axis in either a first or second direction;

(b) sense means coupled to said data storage element;

(c) a single conductor juxtaposed to said data storage element and parallel to said EASY axis;

(d) means applied to said single conductor to provide an increasing two-step pulse, said means comprising a first means for producing a rotation of the magnetization through an angle away from said EASY axis when either in said first or second direction, said means also comprising a second means for producing a further rotation of the magnetization through an angle away from said EASY axis when either in said first or second direction, the output signal obtained by said further second rotation increasing the signal to noise ratio induced in said sense means.

2. The combination in accordance with claim 1 wherein strobe means are coupled to said sense means to read out the signal induced in said sense means during said second step pulse.

3. The combination in accordance with claim 1 wherein said wire has a magnetic coating whose thickness is on the order of 10,000 angstroms.

4. The combination in accordance with claim 1 wherein said data storage element comprises a plated magnetizable wire having a continuous magnetic coating and also having the property of uniaxial anisotropy, the intersection of said wire and said conductor comprisinig a bit position.

5. The combination in accordance with claim 4 wherein said wire has a diameter of 5 mils.

6. The combination in accordance with claim 5 wherein said wire is composed of beryllium-copper.

References Cited

UNITED STATES PATENTS 3,071,756 1/1963 Pugh ---------------- 340—174
3,422,408 1/1969 Turczyn -------------- 340—174

BERNARD KONICK, Primary Examiner

G. M. HOFFMAN, Assistant Examiner